United States Patent Office 3,074,862
Patented Jan. 22, 1963

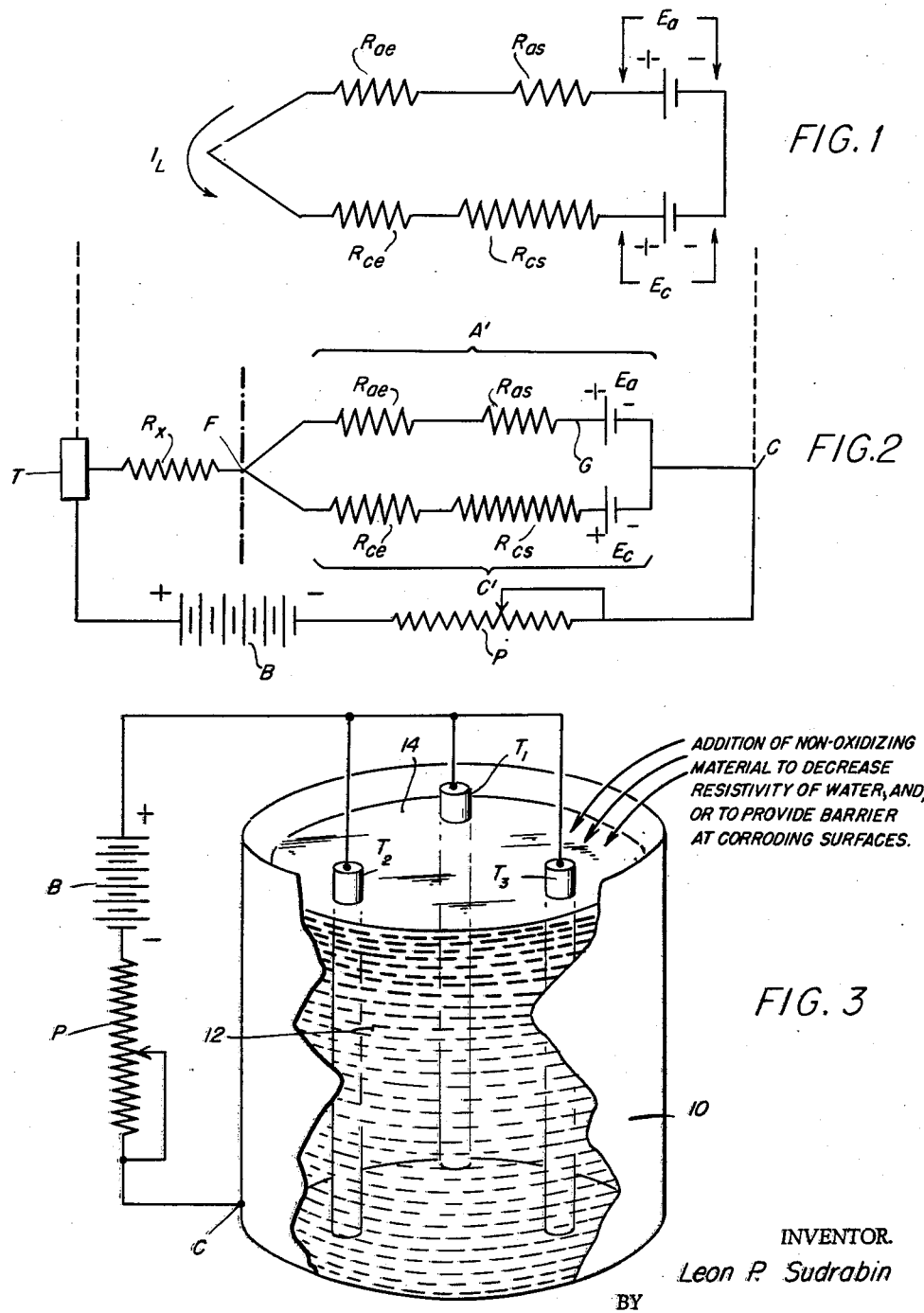

3,074,862
CATHODIC PROTECTION OF METAL SURFACES EXPOSED TO AQUEOUS LIQUID
Leon P. Sudrabin, Berkeley Heights, N.J., assignor to Electro Rust-Proofing Corporation (N.J.), Belleville, N.J., a corporation of New Jersey
Filed Aug. 5, 1955, Ser. No. 526,695
4 Claims. (Cl. 204—147)

This invention relates to methods for cathodic protection of metal surfaces exposed to bodies of water, including plain water, or other aqueous liquid equivalent in adaptability to such methods. Specifically, these procedures involve the application of protective unidirectional current flow from one or more anodes in the water, to prevent or retard corrosion of submerged metal surfaces. Among others, one example of structures for which the present invention is of special advantage for improving cathodic protection, is in the case of water storage vessels for sprinkler systems, in which water may be confined for long periods of time.

The corrosion of submerged metal surfaces has been recognized as involving galvanic cell activity wherein each spot or area that is corroding is anodic in relation to some cathodic and non-corroding area or structure. A very common situation involves the corrosion and pitting of iron or iron alloys in relatively localized anodic areas. The principle of cathodic protection is to construct or create an electrolytic cell in which the locally anodic, corroding area, i.e. the area to be protected, becomes the cathode (and thus non-corroding) while current is projected through the electrolyte (in present systems, the aqueous liquid, considered as water) from an auxiliary anode. Cathodic protection has been defined as being optimum when an electromotive force is applied with the correct polarity and value to provide zero flow of current through the locally anodic, corroding areas; the effect is as if the current projected to such an area exactly opposes the local (corroding) current tending to flow from it. In a given structure such as a steel tank filled with water, there may be a great multiplicity of corroding areas, for example many minute, discrete spots which are locally anodic and surrounded by or otherwise adjacent to areas which constitute cathodes for the local corrosion current. A special problem of the art of cathodic protection is so to constitute the protective system, especially by selecting the number and position of the auxiliary anodes and by selecting the volatge applied (usually in common to all of the anodes), as to create effective protecting cells with as many as possible of the corroding areas.

The present invention is designed to provide improvement in the procedure of cathodic protection, e.g. for attaining more complete or more uniform action with respect to the corroding areas, for reducing the number of anodes needed, for rendering the anode positions less critical, and for reducing the electric power required, or for achieving any one of these and other advantageous results, the improvement being especially significant under certain conditions, such as a high resistivity in the body of water. In accordance with the invention, it has been discovered that by incorporating substances of certain types or classes, as described below, in the body of liquid to which the metal structure is exposed, one or more of the above results are obtained in cathodic protection of the structure. Contrary to a belief that the addition of salts or the like to water would tend to increase corrosion, and despite the fact that an increase of conductivity of a liquid tends to provide higher current flow, the present procedure so modifies the circumstances of the protection cell as to afford greater or more widely effective inhibition of corrosion, and accomplishes the purposes of the system with a marked economy of electric power.

In the accompanying drawings, which are intended to illustrate the description of the invention hereinbelow:

FIG. 1 is a schematic diagram representing the electrical parts of a corrosion cell, according to present theory;

FIG. 2 is a like diagram showing the application of cathodic protection; and

FIG. 3 is a diagrammatic view of a protective system applied to a water tank, as for practice of the process of the invention.

It is to be understood that although the theories stated herein are believed to be well founded, the procedures of the invention are of demonstrated practical effectiveness and are not dependent on any particular hypothesis.

Referring to FIG. 1, which is a representation or analog of the electrical characteristics of a corrosion cell as at present understood, the anode potential (of the anodic corroding area) is $E_a$ and the cathode potential (of the cathodic area, directly connected to the anodic area by the metal tank or other structure) is $E_c$. These are closed circuit potentials. $R_{as}$ and $R_{cs}$ are respectively the anode and cathode surface resistances, the latter being usually substantially larger than the former. $R_{ae}$ and $R_{ce}$ are the resistances of the electrolyte contigous respectively with the anode and cathode, and within what will be understood, by persons familiar with the art, as the cell boundaries. Since corrosion is assumed to be occurring, $E_a$ is larger than $E_c$, for example as each would be measured against a standard hydrogen electrode, and corrosion current $I_L$ is flowing in the cell, in the indicated direction. The left-hand portion of the diagram represents the path through the electrolyte, and the right-hand end is the metallic connection of the electrodes.

The application of cathodic protection to a corrosion cell is schematically represented in FIG. 2, where the corrosion cell itself is included identically with FIG. 1. From an auxiliary anode T in the body of water, current is projected through both legs A' and C' of the corrosion cell network, such current being derived from a suitable D.C. source B. The amount of applied protective current is controlled by a variable resistor P in the external branch of the protection circuit. The resistance of the electrolytic path from the anode T to the corrosion cell is $R_x$.

A diagrammatic view of such a system is given in FIG. 3, for protection of the inner surface of an iron or steel tank 10, filled with water 12 to a level 14. The external source B of E.M.F. and the variable resistor P are as in FIG. 2, the negative end of this circuit section being connected to the tank 10 at C and the positive end to the auxiliary anode means designated T in FIG. 2 and here represented by three elongated anodes $T_1$, $T_2$ and $T_3$ submerged in the water and appropriately spaced.

Returning to FIG. 2, it will be understood that a complete protection system extends to many corrosion cells, as indicated by the dotted lines. Indeed under a rigorous analysis, each depicted network A'—C' may represent only a part of a given corrosion cell, for example in that optimum protection may happen to be achieved only for the outermost path or paths within the corrosion cell boundaries, as distinguished from inner path or paths (of different length), for which there should then be shown a separate, parallel circuit of $R_x$ and legs A' and C', where actual resistance and current values are different. There may be several such parts to be separately considered. The points discussed hereinbelow, however, are equally applicable to situations where parts of corrosion cells should be considered as separate cells (for circuit analysis), and discussion will therefore be simplified by merely speaking of the network A'—C' as a corrosion cell, whether it is in fact all or only a part of the local system of a specific corroding area or spot.

As defined above, cathodic protection will be optimum when the potential at point F equals that at point G. The current flow through leg A' is then zero, and the protective current flow for this particular cell, through $R_x$, is then the flow through leg C', which must exist, because $E_c$ is less than $E_a$ and therefore less than the potential at F. The total protection current in a complete system is the sum of the currents through the various paths $R_x$; if protection is optimum for all corrosion cells, the total power required is determined by the resistance and current in each branch between T and C, the current of each branch being determined as the current in leg C' by application of conventional laws.

In actual practice it cannot be expected that the defined optimum protection (optimum from the standpoint of efficiency under conditions as presented) will be obtained for all of the multiplicity of corrosion cells occurring. For at least some cells the potential at F may exceed that at G, providing current flow from F to C in leg A' and thus wasting some current. In at least some other cells, the potential at F may be less than at G, so that corroding current still flows in leg A' and the protection against corrosion is incomplete. Ordinarily, by use of a sufficient number of anodes, by their careful placement and by the selection of a sufficiently high external E.M.F., it is sought to provide sufficient total current as to minimize the instances of incomplete protection, even though there may be considerable waste of protective current by its flow through numerous legs A'.

Conditions achieved by cathodic protection are commonly tested with a standard measuring electrode, specifically a saturated potassium chloride (KCl) calomel reference electrode, which may have a stylus tip or the like suitable for probing. Measurements are usually taken with the electrode tip at various points on the inside surface of the tank when the protection system is in operation, although it has now been found that in strict theory the electrode should be at point F in the schematic representation of FIG. 2. It has been considered that if the effect of the operating protection system is to reduce the potential of iron (e.g. point C in FIG. 2) to —0.77 volt measured against the described reference electrode, effective protection is being obtained. If a higher electronegative value is found, it means that F is substantially more positive than G and there is overprotection; a lower value means that F is at a lower potential than G and there is underprotection. In practice it is manifestly impossible to examine all of the possible areas of corrosion, and indeed often difficult to secure what may be considered as representative measurements. For example, adjustment of the system to yield the optimum —0.77 volt test reading when the test electrode is positioned between $R_{ce}$ and $R_{cs}$ will actually result in overproduction; if the test electrode is more remote in the electrolyte, from the corrosion cell, than F, the optimum test reading will be reacted when there is in fact underprotection.

The procedures of the invention involve the improvement of cathodic protection of water storage or similar systems, primarily by adjusting the electrolytic properties of the body of water according to certain principles. In the first place, unusual advantage is achieved by reducing the resistivity of the water, especially where, as with natural water supply in many localities, the resistivity is relatively high, e.g. substantially above 5000 ohms per cubic centimeter. Preferred procedure according to the invention is therefore to adjust the water to a pH of 5 or above and to a specific resistivity of 5000 ohms per cubic centimeter or less. This lowering of the resistivity of the water is conveniently accomplished by adding or otherwise incorporating inorganic ions of the type soluble at pH 5 or above (i.e. at the desired pH); very preferably, the added ions or substance should be essentially non-oxidizing. Particularly preferred materials for such addition are the carbonates, bicarbonates, sulfates, sulfites, nitrates, and phosphates of alkali metals (particularly sodium and potassium), ammonium and magnesium. In a more general sense, inorganic salts of the named metals or ammonium are suitable, although chlorides and other halides are somewhat less desirable than the anions named above. As indicated, oxidizing salts such as chlorates, manganates, chromates and chlorites, are undesirable in most cases because they are depolarizers and tend to increase the protective current. Salts, as preferred above, of some other metals such as calcium and other alkaline earths, may also be employed when they are sufficiently soluble.

In most cases the attainment of a pH of at least about 5 is not difficult, since the normal pH value of the water is apt to be above 5, and the added salt is simply selected to avoid decreasing the pH. It appears to be useful practice to provide a pH above 7, and the salt may be selected to that end if necesary. In all cases the pH maintenance or correction can be achieved either by appropriate choice of the additive or by supplemental alkaline material.

The salt or mixture of salts can be added by introduction in dry or solution form either to the body of liquid in the tank, or by proportionate feed to the water when the tank is filled, or by any other suitable method. Where the body is continuously flowing water, as in a pipe, the additive can be continuously introduced in proper proportion. Experience reveals that for most purposes, in high-resistivity waters, the amount of material to be added will lie within the range of 50 to 2000 parts per million by weight, i.e. relative to the water, as indicated. It is commonly desirable to reduce the resistivity to 5000 ohms per cubic centimeter or less, particularly useful values being 1500 to 3000 ohms per cubic centimeter.

By the described increase of conductivity of the water, improved results are obtained in cathodic protection as generally explained above, and as further outlined below, conveniently in reference to presently understood theory.

In the first place, with reduced water resistivity, the electrolytic resistance component $R_x$ is smaller and is therefore to be considered as relatively more uniform from cell to cell. In consequence, the power requirements are lower, usually because the externally applied voltage can be considerably less, and despite the fact that in many cases the total current flow may be higher. Furthermore, there is more uniformity or greater assurance of protection, e.g. in the usual case where a large number of corrosion cells of varying sizes and locations must be serviced by a single protection circuit. As a corollary to the above, the positional relationship of the auxiliary anodes T to the protected surfaces becomes much less important; fewer anodes may be required, less critically placed.

In the second place, the electrolytic resistance components within each cell boundary, $R_{ae}$ and $R_{ce}$, become smaller. In effect this reduces the electrical difference between points F corresponding to different current paths or lines of a given corrosion cell, or more generally may be considered to make all points F more certain of being brought to desired potential, so to speak, by projection of the protective current through a path $R_x$. This condition provides a further contribution in lowering the sensitivity of the system to the position and configuration of the auxiliary anode means. Since the local cathode surface resistance $R_{cs}$ is usually considerably higher than $R_{as}$, especially relative to $R_{ce}$ and $R_{ae}$, this improvement is reached without substantial relative increase in protective current flow through leg C', and thus without significant increase of power.

Finally, and for similar reasons, the lowering of the several electrolyte resistances contributes to ease of measuring potentials by means of the reference electrode to be placed on or near the protected surface, and thus makes it easier to determine the criteria and results of cathodic protection in a given system in practice. Since the voltage gradients in paths such as $R_x$ and $R_{ce}$ (FIG. 2) are much less, unavoidable displacement of the test electrode from the theoretically desired position F is less significant.

Further specific advantage in cathodic protection is achieved, according to the invention, by additions designed to produce a solution of bicarbonate of an alkaline earth metal or of magnesium, in the water. Again, the addition is preferably non-oxidizing and such as to adjust the resistivity of the water to a value below 5000 ohms per cubic centimeter. Specifically, this procedure contemplates the addition of soluble ions of an alkaline earth salt or a salt of magnesium, plus a soluble bicarbonate salt. The pH should be at least about 5.0 and very preferably between 6.0 and 8.5 (if necessary, adjusted by the additions, or otherwise), while the proportion and amounts of the added material should be such as to produce in the water a concentration of at least 50 parts per million (a convenient upper limit being preferably 2000 p.p.m.) of the bicarbonate of the alkaline earth metal or of magnesium. In preferred practice, the soluble calcium salt is first added and thereafter a bicarbonate of an alkali metal or the like, such as sodium or potassium.

Among various salts as indicated above, calcium chloride and calcium nitrate are particularly suitable; one of these is thus first added, in solution, and thereafter the sodium or potassium bicarbonate is likewise added in solution. This sequence is preferable in order to retard precipitation of calcium carbonate. According to present understanding, the added substances react to produce a solution of calcium bicarbonate, which then circulates to the cathodically protected surface, e.g. the wall of the tank, where, by reaction with the alkali formed by electrolysis, the calcium bicarbonate is converted to the carbonate, which is deposited on the metal surface.

Not only does this procedure afford soluble ions in the water with considerable effect on the protection system as explained above, but the calcareous coating on the metal surface affords substantial additional improvement. It is believed to constitute essentially a mechanical obstruction through which oxygen can only pass with greater difficulty in order to reach the protected surface. It will be understood that oxygen is essential for serious corrosion by galvanic action, for instance in that oxygen is a depolarizing agent, and thus its presence at an iron oxide surface constitutes the latter as an effective local cathode for a corrosion cell. The net effect of the calcium carbonate or magnesium carbonate or hydroxide or similar layer over the iron or steel surface is somewhat as though a high resistance coating had been applied. While it is not understood that there is necessarily an actual increase in $R_{as}$ or $R_{cs}$, the result is similar. Specifically it is noted that after such treatment less power is required for cathodic protection, while the actual protection is more uniform in that less protective current must flow through leg C' of the corrosion cell in order to equate the potentials of points F and G, and the system is less sensitive to anode location and shape and less sensitive to reference electrode position.

Another procedure pursuant to the invention for improving cathodic protection systems involves adding to the body of water one or more soluble salts of aluminum, zinc or iron, or a combination of salts of these elements, while adjusting or maintaining the pH to a value in the range of 6.0 to 9.0. Again preferably the addition is such as to provide a relatively high conductivity in the water, i.e. unless such conductivity already exists. The preferred practice is to provide a specific resistivity of 5000 ohms per cubic centimeter or less. In general the salts should be soluble salts, selected from the classes described above, and as in other cases oxidizing substances should be avoided. In the case of iron salts, ferrous compounds are preferable as being more readily soluble, even though the various ions are converted rather promptly to the ferric state in the water. At the pH stated, and under the conditions of cathodic protection, the defined metal ions, which should be introduced in a concentration at least greater than 5 p.p.m., form positively charged colloidal particles of metal hydroxide which migrate to the cathodically protected surface under the applied field. At such surface they are understood to form a stagnant layer, which affords a mechanical obstruction to the passage of oxygen and provides an effect somewhat equivalent to that of a higher surface resistance, all with similar results to that of the calcium carbonate coating derived from the alternative process above. In most cases a maximum addition of 100 p.p.m. of the metal ions need not be exceeded; usually a lesser quantity will be enough for effective improvement.

The following are examples of procedures of the invention, in connection with the practice of cathodic protection by systems such as shown diagrammatically in FIG. 3.

*Example I*

A steel tank having a capacity of 100,000 gallons filled with water was arranged for protection by means of three submerged auxiliary anodes, each of aluminum and each having a diameter of ¾ inch and length of 24 feet. The treatment comprised the distribution of 100 pounds of sodium bicarbonate as a dry powder, over the water surface. The material was allowed to dissolve, in distributive fashion, in the water. Before treatment the water had a resistivity of 32,600 ohms per cubic centimeter and a pH of 6.7. The voltage applied to the three anodes in parallel was 32 volts and a total protective current of 0.8 ampere resulted. Measurements made with the calomel reference electrode adjacent the submerged tank surface gave readings for the tank metal which were generally less than 0.77 volt electronegative, thus indicating that protection was clearly inadequate. Experience has indicated that in such case many more anodes are ordinarily needed, with careful attention to their location, in order to achieve useful protection, which then requires the same relatively high voltage and a larger current. After the described treatment with sodium bicarbonate, however, the water had a resistivity of 2400 ohms per cubic centimeter and a pH of 8.5. The applied voltage was reduced to 8 volts, where with a total protection current of 2.7 amperes the protective effect was found to be good, as determined by reference electrode measurements. The latter universally revealed a potential of 0.77 volt electronegative or better.

*Example II*

A tank of steel construction having a capacity of 75,000 gallons and filled with water was subjected to cathodic protection with three submerged aluminum anodes, ¾ inch diameter, 20 feet long. The treatment procedure involved preparation of a solution of 57 pounds of calcium chloride in 55 gallons of water, and then pumping this liquid slowly into the tank through a hose having its end submerged and gradually raised and lowered throughout the tank. The process was then repeated with a solution of 73 pounds of sodium bicarbonate in 55 gallons of water. Before treatment the resistivity of the water was 14,000 ohms per cubic centimeter and the pH was 6.8. At 27 volts on the anodes the total protection current was 1.6 amperes and with the test electrode at various localities, tank potentials were measured as from 0.70 to 1.30 volts electronegative, indicating incomplete protection in at least some areas of the tank. At a time one month after the described treatment (the water having remained in storage in the tank), the resistivity was 2030 ohms per cubic centimeter and the pH 7.4. With only 5 volts applied to the anodes and a total protective current of 1.2 amperes, it was found that the potentials measured with the test electrode varied from 0.80 to 0.91 volt electronegative. Thus it appeared that adequate and much more uniform protection was achieved, with considerably less power.

*Example III*

A 40-gallon steel tank, filled with water, was subjected to cathodic protection with a single auxiliary anode of carbon and graphite, two inches in diameter and 20 inches long. The special treatment consisted in adding 0.016 pound of ferrous sulfate ($FeSO_4 \cdot 7H_2O$). Before treatment the resistivity of the water in this case was 2500 ohms per cubic centimeter, the pH 7.7, and at an applied voltage of 4.5 with a protective current of 0.3 ampere, protection was measured to be adequate with the calomel reference electrode (−0.77 volt). Two days after treatment the resistivity and pH of the water were the same, but at an applied voltage of 2.0 and with a protective current of only 0.08 ampere, test measurements showed that the same adequacy of protection was achieved. It will be apparent that although in this case there was no need to reduce the resistivity of the water, the layer of iron hydroxide formed adjacent the protective surface was effective to permit greatly reduced power consumption without adverse effect on the adequacy of corrosion control.

It is to be understood that the invention is not limited to the specific procedures herein described but may be carried out in other ways without departure from its spirit.

I claim:

1. In a method of cathodic protection for the interior ferrous metal surface of a vessel, the procedure which includes filling the vessel with water, and which comprises the steps of: incorporating into and distributing in solution throughout said water, a soluble salt, selected from the class consisting of nitrate and chloride, of a metal selected from the class consisting of alkaline earth metals and magnesium, said water being established and maintained at a pH of 5.0 to 8.5, said above-defined salt being introduced in an aqueous solution thereof prepared prior to said introduction, incorporating into and distributing in solution throughout said water, after the aforesaid incorporation and distribution of the above-defined salt, a soluble bicarbonate of an alkali metal, said soluble bicarbonate being introduced in an aqueous solution thereof prepared prior to said introduction, the pH of the water in the vessel being maintained in the aforesaid range as and after said soluble bicarbonate is introduced, and passing unidirectional current through the water from anode means in the vessel to said ferrous metal surface to provide cathodic protection for said surface, the aforesaid selected materials being added to the water in amounts equal to not more than about 2000 p.p.m., said soluble bicarbonate reacting in the water to produce the bicarbonate of the aforesaid metal selected from the class consisting of alkaline earth metals and magnesium, said last-mentioned reaction-produced bicarbonate being thereafter converted at the cathodically protected surface, while said unidirectional current is being passed, into a deposit of the carbonate of said metal selected from the class consisting of alkaline earth metals and magnesium, at said surface, and said first-mentioned salt and said soluble bicarbonate being introduced in the water in amounts sufficient to provide at least 50 p.p.m. of said reaction-produced bicarbonate in the water.

2. A method as defined in claim 1, in which the first-introduced salt comprises a soluble calcium salt, said salt reacting with the thereafter introduced soluble bicarbonate to produce calcuim bicarbonate in the water, and said calcium bicarbonate being converted, during passage of the protective current, into a deposit of calcium carbonate at the aforesaid ferrous metal surface.

3. A method as defined in claim 2, in which the first-mentioned salt is calcium chloride and in which the subsequently introduced soluble bicarbonate is sodium bicarbonate.

4. A method as defined in claim 1, in which the first-mentioned salt comprises a soluble salt of magnesium, said magnesium salt reacting with the soluble bicarbonate to produce the bicarbonate of magnesium, and said bicarbonate of magnesium being thereafter converted at the cathodically protected surface, during passage of the protective current, into a deposit of magnesium carbonate at said surface.

References Cited in the file of this patent

UNITED STATES PATENTS 2,839,462 Nelson _____ June 17, 1958

OTHER REFERENCES

Evans: Metallic Corrosion, Passivity and Protection, Edward Arnold and So., London, 1948, page 506.

Caldwell et al.: Trans. Electro Chem. Soc., 1939, 76, p. 271.

O'Brien: Water Works and Sewage, vol. 89, No. 7, July 1942, pp. 285–291.

Robinson: Trans. Electrochem. Soc., 1946, 90, pp. 485–507.

J. Electro Chemistry, vol. 74, 1938, page 519 (article by Meers).

Handbook of Chemistry, Lange, sixth edition, 1946, Handbook Publishers Soc., Sandusky, Ohio, page 747.

Kreiser et al.: "J. Am. Chem. Soc." vol. 30, pp. 1711–14.